United States Patent

[11] 3,578,055

| [72] | Inventors | Tom French;<br>Vernon E. Gough, Sutton Coldfield,<br>England |
|------|-----------|------|
| [21] | Appl. No. | 837,961 |
| [22] | Filed | Oct. 11, 1968 |
| [45] | Patented | May 11, 1971 |
| [73] | Assignee | The Dunlop Company Limited<br>London, England |
| [32] | Priority | Oct. 18, 1967 |
| [33] | | Great Britain |
| [31] | | 47346/67 |

[54] TREAD WEAR INDICATOR
3 Claims, 24 Drawing Figs.

| [52] | U.S. Cl. | 152/330 |
|------|----------|---------|
| [51] | Int. Cl. | B60c 11/00 |
| [50] | Field of Search | 152/210, 330 |

[56] References Cited
UNITED STATES PATENTS

| 3,186,466 | 6/1965 | Keinanen | 152/210 |
| 2,102,784 | 12/1937 | Bridges | 152/330 |

FOREIGN PATENTS

| 631,215 | 6/1936 | Germany | 152/330 |
| 724,463 | 12/1965 | Canada | 152/330 |
| 1,294,744 | 4/1962 | France | 152/330 |

*Primary Examiner*—Arthur L. La Point
*Assistant Examiner*—Robert Saifer
*Attorney*—Stevens, Davis, Miller and Mosher

ABSTRACT: A pneumatic tire having a recess formed in the tread rubber thereof by cutting or moulding a recess shoulder portion formed in the rubber bounding the recess, and a tread wear marker located in the recess having at least a part thereof located radially inwardly of the said shoulder portion and secured in position thereby, the marker comprising, at least in part, material which may be distinguished either visually or audibly upon rotation of the tire on a hard surface for indicating a degree of tread wear which has occurred in the rubber adjacent the marker.

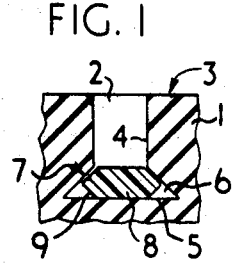
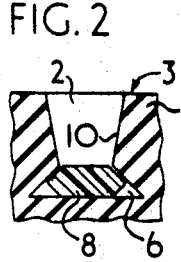
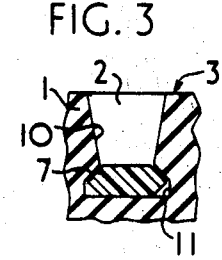
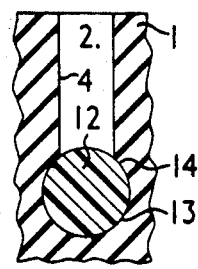
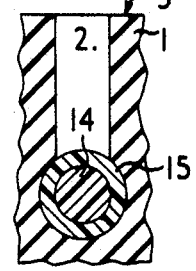
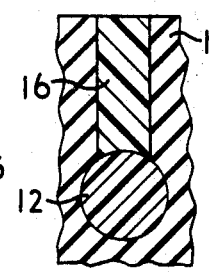
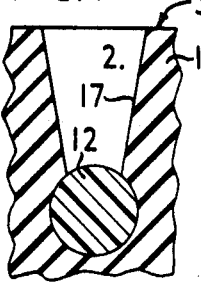
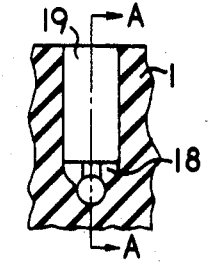
INVENTORS
TOM FRENCH
VERNON E. GOUGH

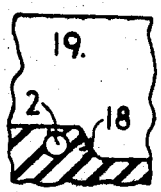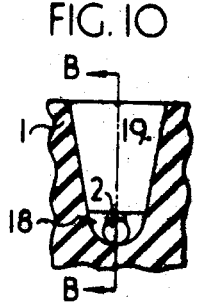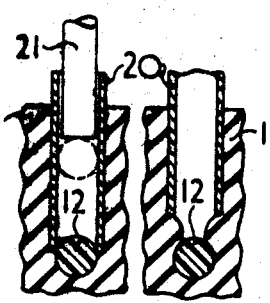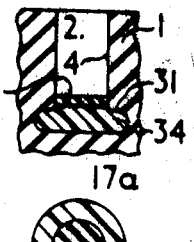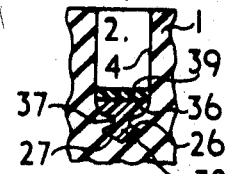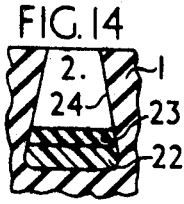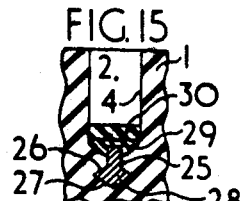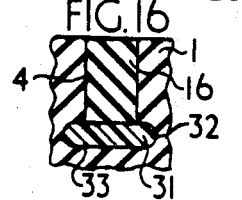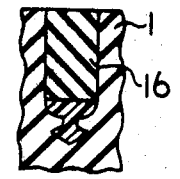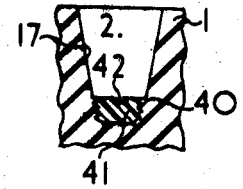

TREAD WEAR INDICATOR

This invention relates to pneumatic tires.

Tires are usually provided with a tread pattern on their exterior surface to improve the grip of the tire on a road surface but, when the tread pattern is worn, for example, to the extent that the average depth of the pattern is less than 1 or 2 mms., under wet conditions, the tire can be unsafe since it is subject to aquaplaning and both braking and acceleration are impaired.

It is therefore desirable to have some means for warning a tire user when the tire tread has been worn to an extent that it may be unsafe in use.

It is an object of the present invention to provide a pneumatic tire and a tread wear marker which will provide a warning to a tire user when the tire has been worn to an extent beyond which it may be unsafe to use.

According to the present invention a pneumatic tire has a recess formed in the tread rubber thereof, a recess shoulder portion formed in the rubber bounding the recess, and a tread wear marker located in the recess having a least a part thereof located radially inwardly of the said shoulder portion and secured in position thereby, the marker comprising, at least in part, a distinguishable material for indicating a degree of tread wear which has occurred in the rubber adjacent the marker.

The invention also includes a tread wear marker as defined in the preceding paragraph for fitment to a tire.

The invention can take many different forms which include variations in the shape of the recess, in the shape of the wear marker, in the material from which the marker is made and composite forms of marker. For example, the tread wear marker may be of substantially spherical shape in which case it may be designed to fit into a part-spherical chamber in the tread rubber at the base of a cylindrical or tapered feed hole through which the marker may be forced by a plunger during fitting to be secured there by virtue of the engagement of the marker, which is of substantially the same size as the chamber, with the shoulder portion formed at the junction of the hole and the chamber. Alternatively, the wear marker may, for example, be of cubical or other block-shape, cylindrical or disc-shaped, frustoconical, prismatic in shape, plain, flanged or screw-threaded for insertion into an at least partially complementary-shaped recess. To improve securement, the marker may be adhered within the recess or, in the instances where it is made of vulcanizable material, vulcanized in position.

The tread wear marker may be distinguishable visually, in which case it is manufactured of a material e.g. rubber or plastics, of a color different from that of the tread rubber, which is usually black. Alternatively or additionally, the marker may be distinguished audibly, upon rotation of a tire to which it is fitted upon a hard road surface, by virtue of the fact that the tread wear marker is manufactured from a material e.g. metal, a hard rubber or plastic material, porcelain, glass fiber, or a hard textile material, which is substantially harder than that of the tread rubber, the audible signal being given at the stage of tread wear at which the wear marker engages with a road surface simultaneously with the remaining unworn tread rubber.

Furthermore, the wear marker itself may be of composite construction, the marker having a first-wearing surface of e.g. a rubber of similar coloration to that of the tread and a second portion of a different material which can be distinguished as indicated in the preceding paragraph.

The recess, which may be formed during moulding or cut in the tread after moulding of the tire, may be located either in a tread rib or a block or a platform adjacent to the base of a groove such that the distinguishable portion of the marker becomes exposed or fully exposed to indicate the degree of tread wear at the appropriate time, and the distinguishable portion of the block may be obscured either by a covering rubber attached to or forming part of the wear indicator as referred to above, or, where the marker is secured at the base of a recess, the recess itself may be filled by a separate rubber plug which may be of the same color as that of the tread or at least of rubber having a color different from that of the wear marker.

In a yet further arrangement the wear marker and/or the plug may be provided with colored layers one upon another and disposed so that at different stages of wear different colors are exposed.

Embodiments of the invention will now be described by way of example with reference to the accompanying drawings wherein:

FIG. 1 shows a tread wear marker secured in a tread recess in a tire according to a first embodiment of the invention, FIGS. 2 and 3 show two modifications of the embodiment illustrated in FIG. 1, FIGURE 4 shows a tread wear marker secured in a tread recess of a tire according to a second embodiment of the invention, FIGS. 5, 6 and 7 show modifications of the embodiment shown in FIGURE 4, FIG. 8 shows on a smaller scale to FIGS. 1 to 5 one position of the recess of the second embodiment shown in FIG. 4 with respect to a tread groove, FIG. 9 shows a view on the line A–A in FIG. 8, FIG. 10 shows on a smaller scale to FIGS. 1 to 5 another position of the recess of the second embodiment shown in FIG. 4 with respect to a tread groove, FIG. 11 shows a view on the line B–B in FIG. 10, FIG. 12 illustrates a method of inserting the marker of the second embodiment (shown in FIG. 4) into its tread recess, FIG. 13 illustrates a method of inserting the marker of the third modification of the second embodiment (shown in FIG. 7) into its tread recess, FIG. 14 shows a marker located in a tread recess of a tire according to a third embodiment of the invention, FIG. 15 shows a marker located in a tread recess of a tire according to a fourth embodiment of the invention, FIG. 16 shows a marker located in a tread recess of a tire according to a fifth embodiment of the invention, FIG. 17 shows a marker located in a tread recess of a tire according to a sixth embodiment of the invention, FIG. 17a shows a plan view of the embodiment shown in FIG. 17, FIGS. 17 b, c and d show plan views of modified constructions of the embodiment illustrated in FIG. 17, FIGURE 18 shows a marker located in a tread recess of a tire according to a seventh embodiment of the invention, FIG. 19 shows a modification to the seventh embodiment illustrated in FIG. 18, FIG. 20 shows a marker located in a tread recess of a tire according to an eighth embodiment of the invention.

It is to be understood that the tires of the embodiments all comprise the usual carcasses, beads and treads, but these are not fully described on account of the nature of the invention.

The first embodiment of the invention comprises a pneumatic tire having, as shown in FIG. 1, moulded into its tread 1 a tread recess 2 of circular cross section in a plane parallel to the ground-contacting surface 3 of the tire. The recess comprises a cylindrical portion 4 which opens out near the base 5 of the recess (i.e. the extremity further from the ground-contracting surface of the tire) into a chamber 6 of enlarged cross-sectional area. The chamber is of frustoconical form and is thus provided with a shoulder portion 7 for retaining therein a tread wear marker 8 in the form of a disc of diameter slightly larger than that of the cylindrical portion. The disc is formed with symmetrical bevelled edges 9 which conform to the frustoconical shoulder and which enable it readily to be pressed into the recess. In addition, because of this symmetry there is no unpreferred "upside down" position.

The disc is preferably formed of a brightly colored plastics material, which includes an optical brightening agent and which is hard relative to the tread rubber. The disc is painted black i.e. the same color as the tread so that it remains substantially undetected until the paint has worn off. The marker indicates when a depth of tread substantially equal to the length of the cylindrical portion of the recess has been worn away both visually and audibly upon rotation of the tire upon a hard surface.

Alternatively the disc may be of metal or other hard material, or of brightly colored rubber. It may be adhered or vulcanized (depending on the material) into the chamber, or further secured by means of a cylindrical rubber plug (not shown) inserted into the cylindrical portion 4.

A first modification is shown in FIG. 2 (in which reference numerals common to FIG. 1 denote similar integers) comprising a recess 2 formed of a tapered circular cross section portion 10 instead of the cylindrical portion 4 shown in FIG 1. This tapered portion facilitates insertion of the marker 8.

A second modification to the first embodiment is illustrated in FIG. 3 wherein reference numerals common to FIGS. 1 and 2 denote the same integers. In this embodiment the recess comprises a tapered portion 10 similar to that of the first modification. However, the chamber 6 comprises a short cylindrical portion 11 in addition to the portion formed by the frustoconical shoulder 7.

A second embodiment of the invention illustrated in FIG. 4 comprises a spherical tread wear marker ball 12 secured in a recess 2 formed in the tire tread 1. The recess is formed of a cylindrical portion 4 (as in the first embodiment) which opens out into a spherical chamber 13 of substantially the same diameter as the marker ball 12. It is retained in position by engagement with a shoulder portion 14 formed near the junction of the cylindrical portion and the spherical chamber.

As in the first embodiment the ball is preferably formed of brightly colored plastics material painted black. However, as a first modification shown in FIG. 5 it may be formed of two parts an inner spherical part 14 and an outer spherical shell part 15 each of bright plastics material of different colors. Thus two stages of wear may be indicated.

As a second modification shown in FIG. 6, a substantially cylindrical plug 16 of black rubber may be adhered into the cylindrical portion of the recess radially outwardly of the ball 12.

In a third modification of the second embodiment shown in FIG. 7 the recess is formed with a tapered portion 17 in place of the cylindrical portion 4 of the embodiment shown in FIGS. 4, 5 and 6.

As shown in FIGS. 8, 9, 10 and 11, the recess of the second embodiment may be formed in a platform 18 of rubber formed at the base of a groove 19 formed in the tire tread 1. The spherical chamber 13 may be so positioned either that its center coincides with the base of the groove 19 shown in FIGS. 8 and 9 or that its radially inward extremity (with respect to the tire) coincides with the base of the groove 19 shown in FIGS. 10 and 11.

To properly insert the spherical ball 12 of the second embodiment into the chamber 13 of the tread recess it may be necessary to use insertion tools comprising a tube 20 and/or a plunger 21. The use of these tools is illustrated in FIGS. 12 and 13. As shown in FIG. 12 part *a* the tube 20 is forced into the recess 2 to increase the diameter of the cylindrical portion 4. The ball is then forced into the chamber 13 along the tube by means of the plunger 21. Once the ball is in position the tube may be removed allowing the deformed rubber adjacent the cylindrical portion of the recess to return to substantially its original form (part *b* of FIG. 12). In the instance where the recess is formed of a tapered portion 17 i.e. the third modification shown in FIG. 7, it is not necessary to use the tube 20, only the plunger 21 to force the ball 12 into the chamber 13 (see FIG. 13).

A third embodiment of the invention illustrated in FIG. 14 comprises a tire having a tread recess 2 of entirely frustoconical form moulded into the tread 1. The marker in this instance comprises two layers, the radially inner 22 of brightly colored cold-setting rubber or plastics material and the radially outer 23 of black material. Each of these layers is poured into the recess in the liquid state and allowed to set in situ. Each is retained in the recess by engagement with the frustoconical shoulder 24 of the recess. The marker as formed may be harder than the rubber of the tire tread.

A fourth embodiment of the invention illustrated in FIG. 15 comprises a tire having a tread recess 2. This recess comprises a radially outer cylindrical portion 4 which narrows down to a second cylindrical portion 25 radially inwardly of the outer portion. This second cylindrical portion leads into a chamber 26 at the radially innermost extremity of the recess, and is formed of two frustoconical portions 26 and 27 which give the chamber a diamond-shaped cross section (as illustrated). The radially outer of these frustoconical portions (26) forms a shoulder portion for retaining an anchor portion 28 of the tread marker in position. This anchor portion may be of metal, rubber or plastics material and is shaped to fit into and substantially conform with the chamber and second cylindrical portion of the recess. It is pressed into position for use and, as in the third embodiment, two layers of cold-setting rubber or plastics material 29 and 30 poured into the recess, the anchor portion and two layers forming the complete marker.

The fifth embodiment shown in FIG. 16 comprises a tire having a somewhat similar tread recess to that of the first embodiment shown in FIG. 1. However, in this instance the recess comprises a cylindrical portion 4 which leads into a circular chamber 31 which has a larger diameter than the cylindrical portion 4. The edge 32 of the chamber is smoothly rounded. The marker 33 located in the chamber may comprise either a plastics disc, which is harder than the tread rubber, conforming to the shape of the chamber inserted with a suitable tool or may be formed of cold-setting rubber or plastics material. A cylindrical plug 16 of hard black rubber is adhered within and fills the cylindrical portion 4.

The sixth embodiment shown in FIG. 17 comprises a tire having a tread recess shaped similarly to that of the fifth embodiment shown in FIG. 16. However, in this instance the tread wear marker 34 not only fills the chamber 31 but extends a small distance into the cylindrical portion 4. A rubber layer 35 may be either adhered into position to cover the marker, or be formed from cold-setting compound. The cross-sectional form of the recess of this embodiment is circular as shown in FIG. 17*a*, or may be rectangular as shown in FIGS. 17*b*, 17*c* or 17*d*. These three latter alternative forms may be applied to any of the other embodiments.

The seventh embodiment shown in FIG. 18 comprises a tire having a tread wear marker 36 substantially of the form of a collar stud inserted base-outermost into a correspondingly shaped recess 2. The recess comprises a cylindrical portion 4 which narrows down into a second narrower cylindrical portion 37. This second cylindrical portion leads into a chamber 38 of diamond-shaped cross section formed of two frustoconical portions 26 and 27 as in the fourth embodiment shown in FIG. 15. The marker and the radially innermost portion of the recess are of complementary shapes. A layer of black rubber 39 is adhered into position radially outwardly of the marker. As a modification of this embodiment (shown in FIG. 19) the layer of rubber may be replaced by a plug 16 which substantially fills the cylindrical portion of the recess.

A ninth embodiment of the invention illustrated in FIG. 20 comprises a pneumatic tire provided with a tread recess 2 having a tapered portion 17 radially outwards of a screw-threaded portion 40 the screw-thread forming a spiral shoulder. Screwed into this portion is a relatively short and wide screw 41 made of brightly colored plastics material, relatively harder than the tread rubber, which forms the tread marker. This screw is painted black and may be located in position by means of a screwdriver and utilizing the slot 42 formed therein. A rubber plug (not shown) may be adhered in position to fill the tapered portion.

In the case of any of the embodiments referred to in the preceding paragraphs, any appropriate number, say from 5 to 12, tread wear markers may be fitted to a single tread to give a general indication of the extent of wear around and across the periphery of the tread and, where an audible signal is provided by the wear marker the relative circumferential positioning of the markers can be arranged to give a distinctive sound signal upon rotation of the tire over a hard road surface.

The FIG. of the recess and the tread markers should preferably be such that the markers can clearly be seen at a distance of about 3 feet from the tire and this indication can be obtained when an area of 4 square mms. is exposed, when the wear limit is reached, but it may be appropriate to expose only 1½ square mms. On the other hand, if an area of more tan about 30 square mms. is devoted to each wear marker there may be either difficulty in retaining a marker in position or a high penalty to be paid, as regards rate of tread wear, caused by the provision in the tread of the markers. Typically the diameter of a recess having a cylindrical portion 4 is of the order of 3 to 5 mm.

If a graduated indication of depth of wear is required then the colored rubber which is exposed during wear of the tread may be incorporated in the marker in a manner such that increasing amounts of wear expose increasing areas, proportionate or not, of colored rubber. This can be achieved, for example, in a composite marker having both black tread rubber and differently colored rubber layers, by inclining the plane of demarcation between the black and colored rubber layers, when the stud is viewed a fitted position in radial cross section, relative to the wearing surface of the tread.

We claim:

1. A pneumatic tire having a radially inwardly extending recess formed in the tread rubber thereof, the extremity of the recess away from the ground contacting surface of the tire opening into a chamber of enlarged cross-sectional area and providing a shoulder portion, a tread wear marker located in the chamber radially inwardly of the shoulder portion and maintained in position thereby, the marker comprising at least in part a distinguishable material for indicating a degree of tread wear which has occurred in the rubber adjacent to the marker, the wall of the recess above the shoulder tapering gradually outwardly to the surface of the tire.

2. A pneumatic tire according to claim 1, wherein the marker is disc-shaped.

3. The tire of claim 1, wherein the chamber in cross section is of generally frustoconical shape.